Oct. 9, 1962             D. CUTRERA             3,057,006
METHOD OF PREPARING BONED WHOLE FOWL AND PRODUCT
Filed Feb. 29, 1960             3 Sheets-Sheet 1
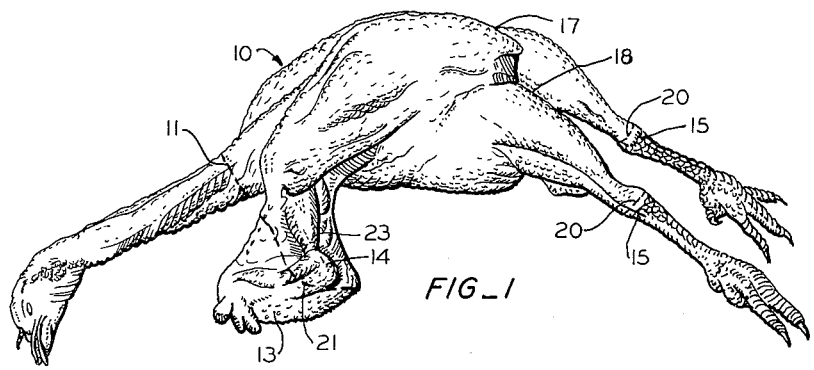
FIG_1
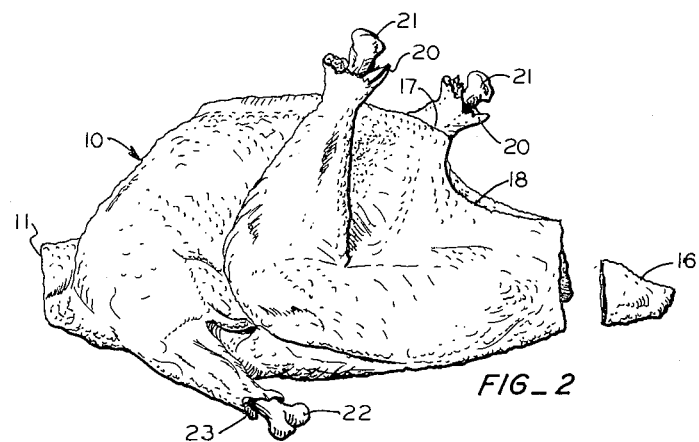
FIG_2
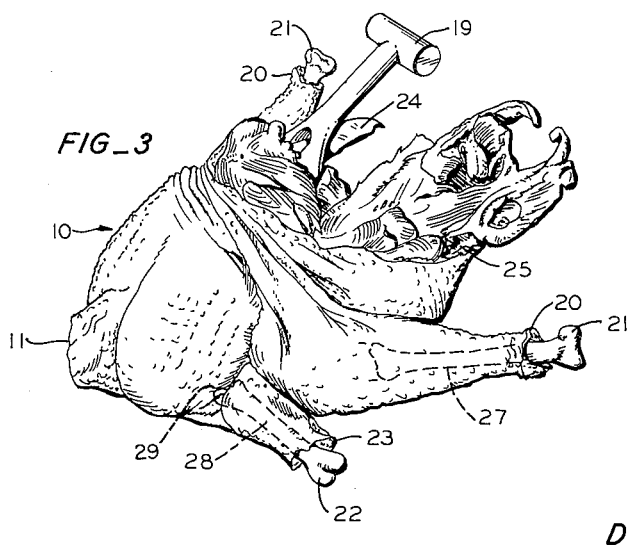
FIG_3
INVENTOR.
DOMINICK CUTRERA
BY
ATTORNEY

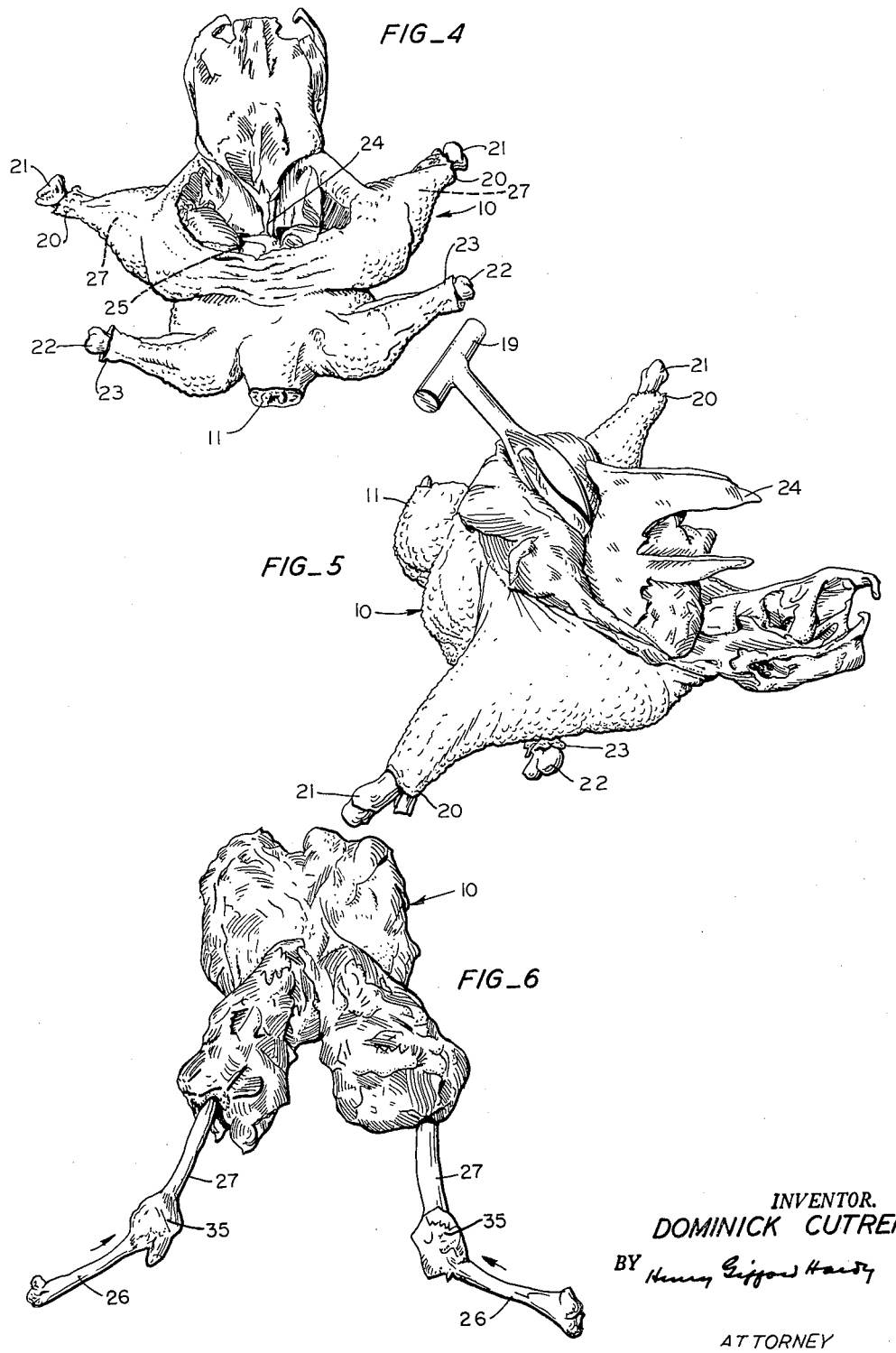

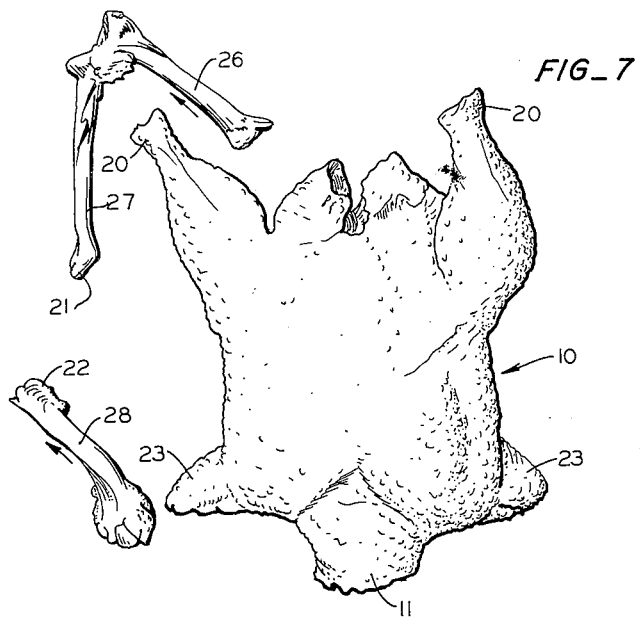
FIG_7
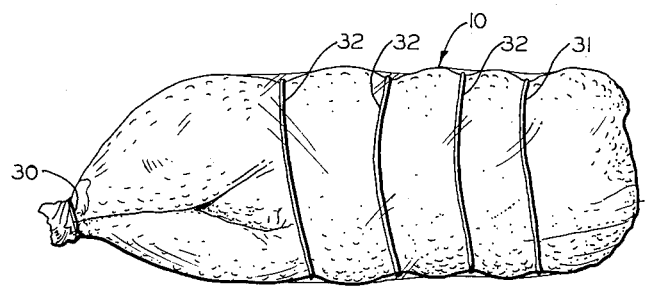
FIG_8

United States Patent Office 3,057,006
Patented Oct. 9, 1962

3,057,006
METHOD OF PREPARING BONED WHOLE FOWL AND PRODUCT
Dominick Cutrera, 3101 Clay St., San Francisco, Calif.
Filed Feb. 29, 1960, Ser. No. 11,911
4 Claims. (Cl. 17—45)

This invention relates to a method of boning dressed fresh fowl and preparing it for sale or use. In particular, this invention relates to an improved method of quickly and easily removing the entire meat and skin portion of a dressed fresh fowl from the bones and skelton of such fowl, in a single connected unit, with only a single cut in the skin thereof for purposes of evisceration, and in the manner of organizing the unbroken skin with the meat attached thereto so as to permit it to retain the semblance of a fowl in solid meat form, without any of the nonedible portions thereof.

The ever-increasing emphasis placed on space saving in the storage and preparation of packaged foods has made it desirable to eliminate as many of the superfluous portions of food products as possible. It has long been recognized that the bones and hollow skeleton structure of fowl constitute superfluous space occupying and waste items. Consequently, there has been a constant search for more efficient methods of deboning fowl in a manner that will keep the alteration of the edible parts of the fowl to a minimum, thereby retaining as much of the form and appearance of the fowl as possible without the use of fillers, while at the same time retaining only the edible portions thereof. Moreover, it is desirable to provide a method of packaging the deboned fowl so that it will present the appearance of a fowl both prior to and after cooking, and be available for cooking without altering the package except for removal of the wrapper.

It is an important object of the present invention, therefore, to provide a method of boning a fowl that will leave a maximum of meat and skin intact and in one single piece, with not more than one cut in the skin thereof, in the edible portions.

It is a further object of the present invention to provide a means of expediting the removal of the meat with the skin attached thereto with a minimum of time and effort.

It is another object of this invention to provide a method of removing the skin and meat of a fowl from the skeleton and bones in a manner that will leave the meat and skin in a condition best suited for ease and rapidity in packaging.

Another object of this invention is to provide an improved method of severing the leg and wing bones from the meat and skin attached to them so that the shape of the wings and legs will be substantially retained in one unbroken piece along with the other portions of meat and skin, and without cutting the skin sleeves encircling the wing and leg bones.

It is also an object of this invention to provide a means of severing the leg and wing bones from the meat and skin as a unit in a manner that will permit the leg and wing bones to be removed from the inside without damage to or altering the shape or cutting the skin of the leg or wing sleeves.

It is a further object of this invention to provide an improved method of removing the ligaments and tendons from the leg joints in a manner that will expedite the removal of the skin and meat from the leg bones.

Further objects are to provide a process of maximum simplicity, economy, and ease of operation, also such further objects, advantages and capabilities as will fully appear and as are inherently possessed by the method and the invention described herein.

Invention further resides in the combination, construction and steps of the method illustrated in the accompanying drawings, and while there is shown therein a preferred embodiment thereof, it is to be understood that the same is capable of modification and change, and comprehends other details of the process without departing from the spirit thereof or the scope of the appended claims.

Referring to the drawings:

FIGURE 1 is a side perspective view of a fresh dressed and eviscerated turkey.

FIGURE 2 is a side perspective view of the turkey as prepared and in readiness for deboning in accordance with the present invention.

FIGURE 3 is a perspective front three-quarters view of the turkey in the preliminary stages of removing the meat, with the skin intact, from a portion of the back and breast bones.

FIGURE 4 is a top plan view of the turkey carcass just prior to the severance of the legs at the hip joint.

FIGURE 5 is a side perspective view showing the removal of the meat just prior to the severance of the legs at the hip joint.

FIGURE 6 is a perspective top view of the inside out or rolled back meat with the still joined upper and lower leg bones about to be removed.

FIGURE 7 is a top plan view of the whole and uncut turkey meat with its skin attached, unrolled and reversed to its natural form and comprising only the edible portions of the turkey 10. The leg and wing bones which have been removed are arranged alongside.

FIGURE 8 is a perspective side view of the finished product.

Referring now more particularly to the drawings in which like reference numerals refer to like parts in the several views and with particular reference to FIGURE 1, there is shown a fully dressed and eviscerated fresh turkey 10. Each succeeding figure of the drawings portrays a characteristic step in the progressive stages of the method herein described and disclosed.

There are certain necessary preliminary acts in preparing the dressed and eviscerated fresh turkey 10 for deboning. The head and neck are severed as at 11 and removed. Surplus nonedible portions of each wing 13, including the tips are also removed along the broken line 12, the severing of the wing 13 being made at the elbow joint 14. The nonedible portions of the legs and feet are removed at the knee joint 15. Next the tail portion 16, which is usually considered as nonedible, is severed and removed at the option of the operator. It is to be noted that the turkey 10 has previously been cut along the longitudinal axis between the lower or rearward portion of the breast 17 and the tail 16 as at 18 for purposes of evisceration, and this cut constitutes the only cutting through the skin in the edible portions.

In order to free the flesh and skin from the wing and leg bones, a circular cut is made at 20 completely around the legs just above the ball of the leg joint 21 and also just above the ball joint 22 of the wing as at 23, above indicating the direction closer to the body. The solid ligaments and tendons in the leg are partially removed at the cut 20 from the outside, when the feet are removed. This prepares the turkey 10 for the deboning operation which is the subject of this invention, and the prepared form is substantially that shown in FIGURE 2.

With a sharp straight boning knife, and working from the severed tail portion 16 forwardly along the back of the turkey, the flesh or meat is carefully removed from the back frame bones and as the work progresses the meat with the skin attached is carefully rolled back upon itself in the same manner that a slip over sweater is removed. Care is taken to see that the meat of the turkey remains intact and attached to the skin at all times. When this has been accomplished for a distance along the back up to the hip joint 25 and meat and skin rolled back upon itself in the manner described, then the severing of the meat from the breast bone 24 and the rib casing is commenced.

When the rearward tip of the breast bone 24 has been exposed and the meat is separated from the rib casing adjacent the breast bone, it is possible to use a special tool 19, such as the one described in Patent No. 2,793,392, which permits the simultaneous removal of the meat from both sides of the breast bone 24. However, it should be understood that the same end results can be accomplished by using the standard boning knife, only it takes more time and requires greater skill in the handling. No matter what tools are used, the meat, with the skin attached, is rolled back on itself in the same manner.

As the skin with the meat intact thereon is removed from the breast bone 24 and rolled back, it becomes possible to move the legs so that the lower portions thereof are substantially spread-eagle, such as shown in FIGURES 4 and 5, with the bones 27 substantially at right angles to the longitudinal axis of the fowl. It is apparent that this movement is further aided by the cutting away of the meat from the rib casing below the breast bone 24. In so doing, the hip joint 25 of the leg bone 26 is exposed. The upper leg bone 26 is severed from the back at this joint 25, care being exercised not to cut into or through any of the adjacent skin or meat. With the upper leg or thigh bones 26 disconnected from the body at the hip joint 25 the operator is able to continue the removal of the meat and attached skin along the back of the turkey, continuing the inside out rolling of the meat as the same is cut from the bones. This procedure is continued until the wing shoulder socket joints 29 are reached. The operator separates the wing bones 28 from the body bones at the socket joints 29 without cutting the skin or meat. It is then possible for the operator to then continue and complete the separation of the meat from the remaining portion of the carcass or skeleton. At the conclusion of the separation, the entire meat of the turkey is in one piece still attached to the skin, but is completely inside out with the exception of the wing portions and the leg portions. The freed skeleton is, of course, discarded.

The operator is then enabled to work with comparative freedom in the removal of the remaining bones of the legs and wings.

Commencing at the severed hip joint 25 and working in the direction of the arrows in FIGURES 6 and 7, the meat is carefully removed from the upper leg or thigh bone 26 by the boning knife, without cutting the meat in any way except as it adheres to the bone itself. As the meat is freed from the bone, the operator pulls gently on the partially freed bone, from the inside, causing the same kind of inside out action as has been described above in connection with the removal of the meat from the main part of the breast and back. By working the knife around the bone 26 with cutting and scraping action, the operator can free the bone 26 of the upper leg joint and the lower leg body 27 without disengaging the bone at the knee 35. Also, since the circular cut 20 has been made and some of the leg tendons and ligaments removed, when the meat has been cut away from the bone 27 of the lower leg, it is then possible to remove the cleaned and still joined upper leg or thigh bone 26 and the lower leg bone 27 from the inside, leaving only the edible meat with the skin sleeve attached and unbroken with the meat and skin inside out. The removed and still joined leg bones 26 and 27 are shown in the lower portion of FIGURE 6. When the reversing or inside out rolling has been completed for a leg, the remaining tendons are exposed and can easily be removed at this time. So far as the leg is concerned, as soon as the leg bones 26 and 27 have been removed, the rolling action may be reversed to restore the leg to approximate its usual visual form. The same operation, of course, is repeated for the other leg.

With respect to the wing portions and again working from the inside, the operator proceeds to remove the flesh from the wing bone 28 in the direction indicated by the arrow in FIGURES 6 and 7, commencing at the joint 29. He repeats the same kind of gentle pulling action, pulling the exposed end 22 of the wing bone inwardly, thus causing a rolling, reversing or inside out action of the freed meat with the skin attached. Here again, because of the circumferential cut 23, as soon as the meat has been freed on the wing bone 28 down to the cut 23, is is possible to remove the bone 28 completely from the inside.

With the removal of the wing bones 28, only the solid meat of the turkey 10 with the skin thereof still intact, remains, but in the inside out condition previously referred to. The operator then unrolls or reverses rolled skin and meat, first with respect to the wings, then the legs and finally the whole body portion, so that only the edible portion remains but is restored to the shape resembling the form of a turkey as shown in FIGURE 7.

It is apparent that the turkey 10 at this point, when it comprises only the edible portions without the skeleton and bone structure cannot maintain its shape in handling nor can any definite form be preserved for presenting a uniform package for marketing. In order to accomplish this, the outer ends of the leg meat portions are tied together as at 30. The wing portions are folded back under and covered by the skin of the neck portion. The head end is tied in this position as at 31. It is apparent that by folding back the wing and neck portions sufficient additional volume is added at this end to make the contour of the finished package substantially uniform, on a longitudinal axis (see FIGURE 8). The remainder of the turkey is tied separately at 32 at spaced intervals to complete the formation of the finished product substantially uniformly cylindrical with the tied leg portions tapering to a point at one end. In this manner the solid meat of the turkey with the unsevered skin still attached thereto is made available for handling and cooking. To provide sanitary means for freezing, transporting, distributing and the like, it is preferable to wrap the finished product shown in FIGURE 8 in a transparent plastic sheet or bag.

In the preparation of a product comprising only the edible portions in uncut and unbroken form, all necessity for hand sewing or lacing are completely eliminated, doing away with the cost of such labor and the resulting unsightly appearance.

While the above description has been with reference to a turkey, it is understood that this was for purposes of illustration only, as the same is equally applicable to any fowl.

I claim:

1. In the method of boning fowl and the like wherein the skin and meat in the edible portions are whole and integrally joined, comprising the steps of severing the head and neck, feet at the knee joint, wings at the elbow joint and tail portion of a picked fowl, eviscerating and cleaning the picked carcass through a single longitudinal cut in the skin between the rearward end of the breast bone and the tail, making complete circular cuts around and just above the knee and elbow joints to free the skin and tendons from the bones of the legs and wings respectively at their outer ends, removing the meat with the unbroken skin attached from the backbone of the carcass commencing at the tail while rolling the freed meat and attached skin back upon itself in an inside out manner until the hip joints are reached, removing the meat with the unbroken skin attached from the breast bone while at the same time continuing to roll back the freed meat and attached skin, severing the leg bones from the back at the hip joints and continuing to remove the unbroken meat and attached skin from the back including severing the attached wing bones at the shoulder joints with the rolling back of the severed meat and skin substantially inside out, removing the skeleton, removing the meat and attached skin from each leg and wing bone from the inside by cutting the meat away only at the bone and pulling each leg and wing meat portion inside out during the cutting, removing any remaining tendons from the meat of the legs, and rolling back the meat and attached unbroken skin of the legs, wings and main body portion to restore the boned meat with the attached skin to a solid shape of edible fowl only with the skin on the outside.

2. In the method of boning fowl and the like wherein the skin and meat in the edible portions are whole and integrally joined, comprising the steps of severing the head and neck, feet at the knee joint, wings at the elbow joint and tail portion of a picked fowl, eviscerating and cleaning the picked carcass through a single cut in the skin between the rearward end of the breast bone and the tail, making complete circular cuts around and just above the knee and elbow joints to free the skin and tendons from the bones of the legs and wings respectively at their outer ends, removing the meat with the unbroken skin attached from the back bone of the carcass commencing at the tail while rolling the freed meat and attached skin back upon itself in an inside out manner until the hip joints are reached, removing the meat with the unbroken skin attached from the breast bone while at the same time continuing to roll back the freed meat and attached skin, severing the leg bones from the back at the hip joints and continuing to remove the unbroken meat and attached skin from the back including severing the attached wing bones at the shoulder joints with continued rolling back of the severed meat and skin substantially inside out, removing the skeleton, removing the meat and attached skin from each leg and wing bone from the inside by cutting the meat away only at the bone and pulling each leg and wing meat portion inside out during the cutting, removing any remaining tendons from the meat of the legs, rolling back the meat and attached unbroken skin of the legs, wings and main body portion to restore the boned meat with the attached skin to a solid shape of edible fowl only with the skin on the outside, folding the meat of the wings back under the main portion, bringing the neck portion back to overlay the wings and tying the same with a cord encircling the body portion to hold them in place, tying the leg ends together, and tying the remainder of the body with a plurality of encircling cords to form a uniformly shaped product comprising only edible fowl.

3. In the method of boning fowl and the like wherein the skin and meat in the edible portions are whole and integrally joined, comprising the steps of severing the head and neck, feet at the knee joint, wings at the elbow joint and tail portion of a picked eviscerated fowl, making complete circular cuts around and just above the knee and elbow joints to free the skin and tendons from the bones of the legs and wings respectively at their outer ends, removing the meat with the unbroken skin attached from the back bone of the carcass commencing at the tail while rolling the freed meat and attached skin back upon itself in an inside out manner until the hip joints are reached, removing the meat with the unbroken skin attached from the breast bone while at the same time continuing to roll back the freed meat and attached skin, severing the leg bones from the back at the hip joints and continuing to remove the unbroken meat and attached skin from the back including severing the attached wing bones at the shoulder joints with continued rolling back of the severed meat and skin substantially inside out, removing the skeleton, removing the meat and attached skin from each leg and wing bone from the inside by cutting the meat away only at the bone and pulling each leg and wing meat portion inside out during the cutting, removing any remaining tendons from the meat of the legs, and rolling back the meat and attached unbroken skin of the legs, wings and main body portion to restore the boned meat with the attached skin to a solid shape of edible fowl only with the skin on the outside.

4. In the method of boning fowl and the like wherein the skin and meat in the edible portions are whole and integrally joined, comprising the steps of severing the head and neck, feet at the knee joint, wings at the elbow joint and tail portion of a picked eviscerated fowl, making complete circular cuts around and just above the knee and elbow joints to free the skin and tendons from the bones of the legs and wings respectively at their outer ends, removing the meat with the unbroken skin attached from the back bone of the carcass commencing at the tail while rolling the freed meat and attached skin back upon itself in an inside out manner until the hip joints are reached, removing the meat with the unbroken skin attached from the breast bone while at the same time continuing to roll back the freed meat and attached skin, severing the leg bones from the back at the hip joints and continuing to remove the unbroken meat and attached skin from the back including severing the attached wing bones at the shoulder joints with the rolling back of the severed meat and skin substantially inside out, removing the skeleton, removing the meat and attached skin from each leg and wing bone from the inside by cutting the meat away only at the bone and pulling each leg and wing meat portion inside out during the cutting, removing any remaining tendons from the meat of the legs, rolling back the meat and attached unbroken skin of the legs, wings and main body portion to restore the boned meat with the attached skin to a solid shape of edible fowl only with the skin on the outside, folding the meat of the wings back under the main portion, bringing the neck portion back to overlay the wings and tying the same with a cord encircling the body portion to hold them in place, tying the leg ends together, and tying the remainder of the body with a plurality of encircling cords to form a uniformly shaped product comprising only edible fowl.

References Cited in the file of this patent
UNITED STATES PATENTS

| | | |
|---|---|---|
| 1,433,628 | Knaust | Oct. 31, 1922 |
| 2,844,844 | Sieczkiewicz | July 29, 1958 |